United States Patent [19]
Albertin

[11] Patent Number: 5,235,555
[45] Date of Patent: Aug. 10, 1993

[54] DIVING-WAVE MIGRATION USING AIRY FUNCTIONS

[75] Inventor: Uwe K. Albertin, Houston, Tex.

[73] Assignee: Western Atlas International, Inc., Houston, Tex.

[21] Appl. No.: 965,798

[22] Filed: Oct. 23, 1992

[51] Int. Cl.$^5$ .............................................. G01V 1/36
[52] U.S. Cl. ........................................ 367/53; 367/50
[58] Field of Search ...................... 367/50, 51, 52, 53; 364/421

[56] References Cited
U.S. PATENT DOCUMENTS 5,138,584 8/1992 Hale ...................................... 367/53

OTHER PUBLICATIONS

Hale, Dave "Imaging Salt with Turning Seismic Waves" Colorado School of Mines; Hill, N. Ross, Stefani, Joseph P. Chevron Oil Field Research Co.

Primary Examiner—Ian J. Lobo
Attorney, Agent, or Firm—William A. Knox

[57] ABSTRACT

In areas where the velocity gradient is strong or exhibits a significant positive curvature, the usual phase shift f-k migration methods cannot properly image overtuned dips due to diving waves. In this disclosure, an Airy operator is substituted for the classical phase shift operator.

5 Claims, 4 Drawing Sheets

DIVING-WAVE MIGRATION USING AIRY FUNCTIONS

BACKGROUND OF THE INVENTION

1. Field of the Invention

This invention relates to migration of seismic data and in particular to migration of diving wave reflections characterized by dips that exceed 90°.

2. Related Art

As is well known, the propagation velocity of a seismic wavefield through the earth usually increases with increasing depth. The velocity gradient can be attributed to some extent to increased rock compaction because of the increase in static loading of the overlying strata. Additional factors affecting velocity involve rock type, composition, texture, chemistry and orogeny. Commonly, each stratum of the earth is characterized by a velocity that is higher than the velocity of the stratum above it although velocity reversals are known. Thus, the wavefield propagation velocity increases stepwise with depth. The stepwise velocity/depth function can often be approximated by a smooth curve.

A wavefield emanating from a seismic source will propagate downwards into the earth, radiating uniformly in all directions assuming a homogeneous laterally isotropic earth. Assuming also closely-spaced substantially flat-dipping strata, a normally-incident, zero-offset wavefield ray will be reflected from the respective strata and return to the surface as a plurality of reflected events whose travel times are a function of the depths of the strata from which the wavefield was reflected. At angles other than normal incidence, the wavefield ray paths will be curved due to refraction at the interfaces between the successive earth layers. Thus, the trajectory of the wavefield from a source to a receiver after reflection from a subsurface stratum will include a downgoing incident segment and an upgoing reflected segment, both of which will follow a curved path. The amount of ray-path curvature depends upon the steepness of the velocity gradient as a function of depth to the reflecting stratum and the offset between source and receiver. In the presence of a region characterized by a steep velocity gradient, the downgoing component of the ray path trajectory may be reversed and bent back to the surface with no appreciable travel path through a distinctive refractor. The ray path is turned upwards before nominal reflection occurs. It is within the realm of possibility that an upwardly-refracted wavefield will encounter an obstruction, such as a horizontally projecting salt dome edge or the hanging wall of a fault scarp. The wavefield is reflected from the interface, to return to the surface along substantially the same trajectory as the original downgoing wavefield as a refracted reflection. That phenomenon is sometimes known as a diving wave or turning wave. Because the obstruction is seen from below, the dip angle is likely to be substantially greater than the usual 90° limit imposed upon routine data-processing methods.

U.S. Pat. No. 5,138,584, issued Aug. 11, 1992 to Ira D. Hale describes a method for migrating seismic data for formations that are located in geological media that cause seismic waves to be refracted so substantially that the waves turn upward. The method includes the steps of tabulating a first phase shift function as a function of the wave vector and the angular frequency of seismic waves in the geologic media, tabulating a second phase shift function, storing the tabulated values of the first and second phase shift functions, calculating a third phase shift function based upon the first and second phase shift functions and migrating recorded seismic data using the first, second and third phase shift functions.

In a paper presented to the 61st annual meeting of the Society of Exploration Geophysicists in 1991, D. Hale et al. described "Imaging Salt with Turning Seismic Waves" and exhibited examples of steep dip imaging.

The references above cited assumed a constant formation velocity within a plurality of thin layers (dz) and employed phase shift migration to accomplish the desired results. Such migration will result in imaging errors in areas of steep linear velocity gradients or in areas where the vertical velocity function exhibits significant positive curvature. There is a need to provide a method for migration and imaging of overturned dips in such areas as well as to provide a computer-aided processing routine that is economical of computer time.

SUMMARY OF THE INVENTION

This invention provides an exact solution for the classical wave equation for a linear velocity gradient in slowness squared (sloth). A recursive scheme, based on superposition of Airy function quotients, is used for migrating seismic data with realistic earth velocities.

BRIEF DESCRIPTION OF THE DRAWINGS

These and other benefits of this invention will be better appreciated by reference to the appended detailed description of the preferred embodiment and the drawings wherein.

DETAILED DESCRIPTION OF THE PREFERRED EMBODIMENT

Figure 1A:
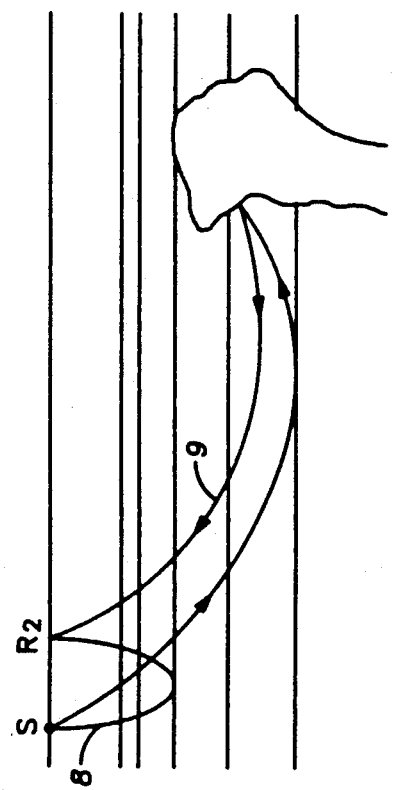
FIG. 1A is a cross section of a stratified earth showing the trajectories of a normal wave field and a diving wave.
Figure 1B:
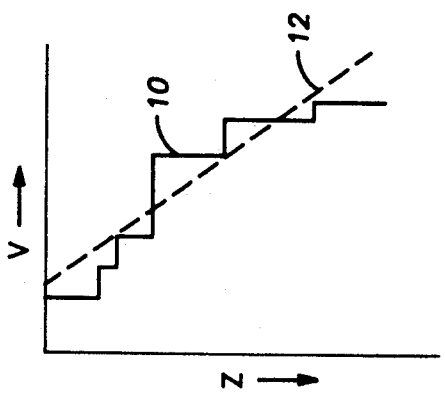
FIG. 1B is a graph of the stepwise velocity function corresponding to the section of FIG. 1A.

In the presence of a stratified section of the earth wherein the seismic-wave propagation velocity V increases linearly with depth Z, the ray trajectory 8, of a normal reflected wavefield and the trajectory of a turned wavefield 9, from a source S to a receiver R1 might appear as in FIG. 1A. The amount of ray-path curvature for the downgoing and upgoing ray-path trajectories depends upon the steepness of the velocity gradient. For data processing, a stepwise velocity/-depth graph, appropriate to an area of study as depicted in FIG. 1B (solid line 10), may be smoothed and approximated by the dashed line 12.

Figure 2B:
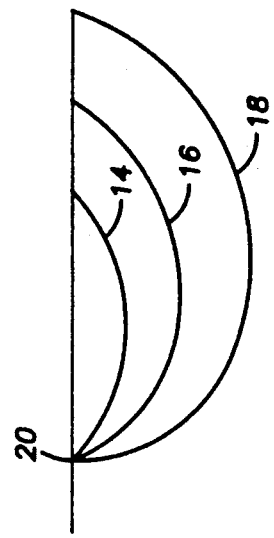
FIG. 2B shows the trajectories of diving ray paths in a linear velocity gradient.
Figure 2A:
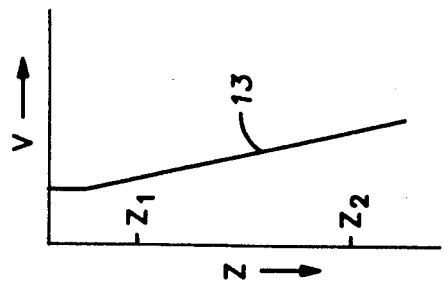
FIG. 2A is a graph of a velocity function having a constant gradient.

Assume now a constant velocity gradient over a depth interval of interest such as Z1-Z2 of velocity-depth function 13 as in FIG. 2A. Increasingly-dipping ray paths 14, 16 and 18, having a common source at 20, will nest neatly together without overlap as shown in FIG. 2B.

Figure 3A:
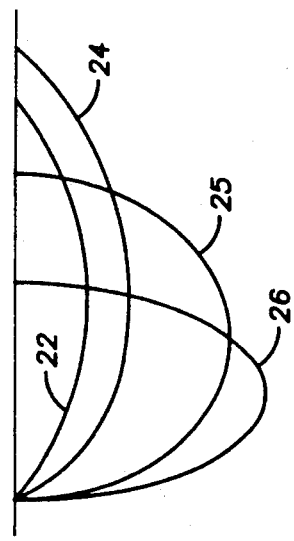
FIG. 3A is a velocity depth graph for a velocity function having a significant positive curvature.
Figure 3B:
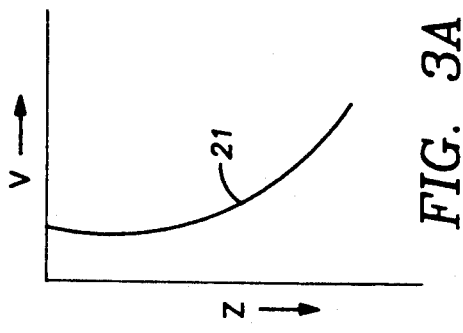
FIG. 3B exhibits a set of driving ray paths in the presence of the velocity function of FIG. 3A wherein the ray paths cross.

For a velocity function whose gradient increases linearly with depth, that is, a function that has a significant positive curvature such as curve 21 in FIG. 3A, a different situation exists. The ray path trajectories 22, 24 and 26 form a caustic; they overlap as shown in FIG. 3B.

It has been found that well-known classical phase shift migration methods involving NMO and DMO applied to constant-velocity depth increments cannot properly image such caustic trajectories.

The classical wave equation that describes the change in the acoustic pressure field as a function of horizontal distance x and depth z is:

$$\left(\frac{\partial^2}{\partial x^2} + \frac{\partial^2}{\partial z^2} + \frac{\omega^2}{V^2}\right)\psi = 0. \tag{1}$$

Assuming the data have been transformed from the time domain to $\omega, k_x$ space, for a constant velocity $V_o$, the exact solution to (1) is $$\psi(z + \Delta z) = e^{-i\Delta z\sqrt{\frac{\omega^2}{V_0^2} - k_x^2}} \psi(z). \tag{2}$$

Figure 4:
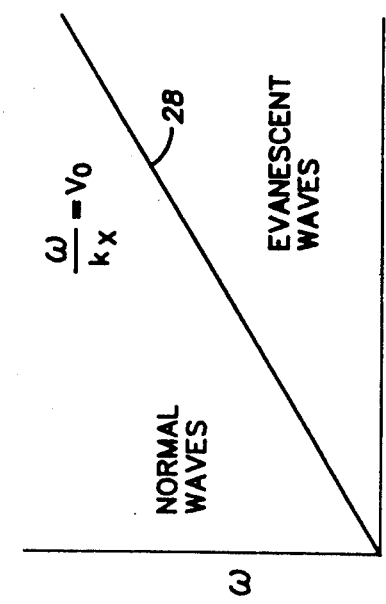
FIG. 4 is a frequency-wave number plot.

For this particular case, the data in the frequency-wavenumber domain may be divided along a single line 28 whose slope corresponds to the velocity $V_o = \omega/k_x$ as seen in FIG. 4. Since the velocity remains constant in depth, the slope of the line in FIG. 4 does not change with depth. Normal data, having dips less than 90° lie above and to the left of line 28; evanescent data having dips more than 90° lie below and to the right of line 28. The migration may thus be accomplished by recursively multiplying only the normal data in FIG. 4 by the phase in equation (2) and summing over frequencies to obtain the migrated output.

Figure 5A:
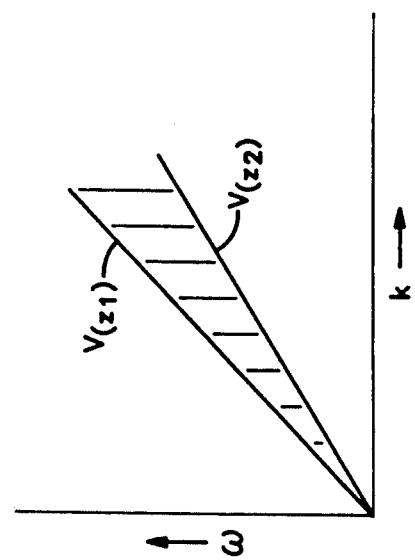
FIGS. 5A and 5B are the velocity-depth graph and the corresponding frequency-wave number plot showing the zone of evanescent waves.
Figure 5B:
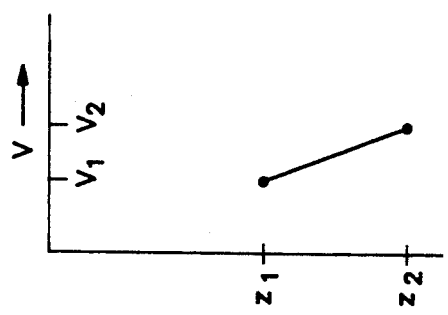

If the velocity variation is monotonically increasing with depth, however, the phase shift may still be applied if one approximates the velocity at each depth step $z_i$, where i is an integer labelling the number of the depth step, as being constant within that depth step. Hence if the desired smooth velocity function is V(z), then the velocity at depth $z_i$ is essentially taken to be $V(z_i)$. It is approximated as being constant from $z_i$ to $z(i+1) = z_i + \Delta z$. Note then that the slope of the velocity line in the $\omega, k_x$ plane now increases monotonically with depth. Hence some data that are normal at a particular depth z1 become evanescent at a larger depth z2. These data correspond to the waves that have been turned upwards in the migration process between depths z1 and z2. In the case there the velocity is linear with depth, for example, this data corresponds to the shaded data in FIG. 5B where the velocity is shown in FIG. 5A.

In classical data imaging, it is customary to use one of two methods. In the first, the normal data are migrated downward in a single pass by multiplying it by the phase in equation (2) with the velocity Vo being replaced by $V(z_i)$ at a particular depth step. The normal data that become evanescent is saved in this initial downward pass. The first pass is then followed by a second pass upward. In the second pass the previously saved evanescent data slowly become normal again as the depth increases. As this happens, the data are again multiplied recursively by the same phase as previously. The result of this second pass is an image of those waves that have turned, and because the method requires two passes, it is referred to as a two-pass diving wave migration.

In the second method, evanescent data are not saved. Instead a second data set is created by multiplying the original data by a precomputed phase that depends upon the travel time for a particular ray as it travels downward to its turning point and back up to the surface. This second data set may then be migrated simultaneously with the original set in a single downward pass.

It is clear from the above discussion that because of the constant velocity assumption used in classical phase shift migration techniques, significant imaging errors will occur in areas where the velocity gradient is large or the best-fitting velocity function has a strong positive curvature. In that case, it is possible for rays that leave a given source point at slightly different angles to cross somewhere along their travel paths before encountering a reflector as shown in FIG. 3B. The region where these rays cross is referred to as a caustic region. In such a region, the acoustic wavefield undergoes significant phase and amplitude changes that cannot be adequately handled by the classical phase shift methods for arbitrary reflector configurations because of the constant velocity assumption.

This invention provides a solution to the wave equation for overturned dips that does not depend upon a constant velocity assumption. This solution can be used to image waves that have passed though caustic regions if the velocity curve can be closely approximated by a curve of a preferred type. Assume that the quadratic slowness or sloth is linear in z according to $$1/V^2(z) = a - bz. \tag{3}$$

In general this equation gives a velocity function that has significant positive curvature that can be altered by adjusting the two parameters a and b. Let Zo and Z be two depths between which the desired velocity curve closely approximates the curve of equation (3). For such velocity field the exact solution to equation (1) is the following extrapolation equation:

$$\psi(\omega, k_x, Z) = \frac{A((Z - \lambda)/c)}{A((Z_o - \lambda)/c)} \psi(\omega, k_x, Z_o) \tag{4}$$

where $$A(u) = Ai(u) - iBi(u) \tag{5}$$

$$a = \frac{1}{V_0^2}, \quad u = \frac{1}{c}(z - \lambda), \quad c = \left(\frac{1}{b\omega^2}\right)^{\frac{1}{3}},$$

$$\lambda = \frac{a}{b}\left(1 - \frac{k_x^2}{\omega^2}\right).$$

Equation (4) shows how the wavefield can be extrapolated from the depth Zo to the depth Z. The terms Ai and Bi are short-hand for the respective Airy functions. The letter i preceding Bi in (3) is the quadrature operator $\sqrt{-1}$.

Equation (4) is analogous to phase shift extrapolation where phase shift has been replaced by a quotient of Airy functions.

One method for fitting the desired curve to the data is to fix the two velocities $v_1$ and $v_2$ at depths Zo and Z, and solve the equations $1/v_1^2 = a - bZ_o$ and $1/v_2^2 = a - bZ$ for the constants of proportionality a and b. c and $\lambda$ may then be computed to do the extrapolation in equation (4). This method is presented by way of example but not by way of limitation since other methods may also be used.

Airy migration has certain advantages over conventional phase shift migration. Phase shift methods can only extrapolate over small depth intervals on the order of tens of feet wherein the velocity is substantially constant. On the other hand, Airy migration is able to extrapolate over any formation thickness $\delta Zi$ for which the physical velocity approximates a linear sloth curve. That is true because the velocity-function parameters are intrinsic in the Airy transform of equation (3). The useful interval for Airy migration may measure thousands of feet. Depending upon imaging resolution requirements, the larger depth interval $\delta Zi$ may be resolved into sub-intervals dzi of any desired thickness.

The process of Airy migration will now be explained. The velocity field, appropriate to the volume of data derived from the area under investigation, is divided into one or more vertical depth zones such as $\delta Zi$ (FIG. 6A), over which are fitted the best-approximated linear sloth curves such as curve segment 30—30'. Relatively large depth intervals are preferable to take advantage of the capabilities of the method of this invention. A different set of constants ai and bi are computed for each of the depth intervals $\delta Zi$. The seismic data are assumed to have been processed in the usual manner to obtain a zero-offset section that has been Fourier transformed to the $\omega$-k domain.

Figure 6B:
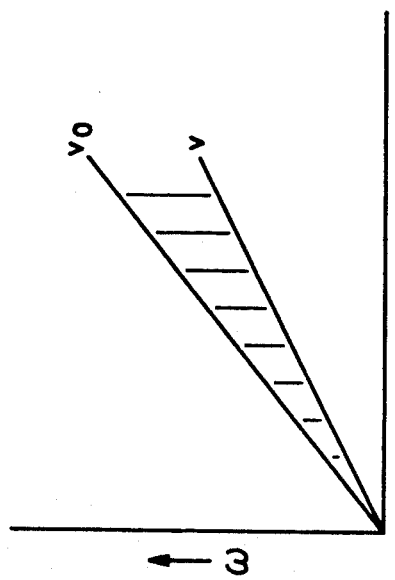
FIG. 6B is the frequency-wave number plot for the downward Airy iteration pass.

The following describes a two-pass method. For the first step, for each depth interval $\delta Zi$ compute the coefficients ai and bi. Resolve the interval $\delta Zi$ into smaller intervals dz, depending upon the imaging requirements. Iterating downwards, define v and z as the current velocity and depth; define vo and zo as the previous velocity and depth, where $dz = z - zo$, as shown in FIG. 6B. For this pass, $v > vo$ and $z > zo$. Sort the normal data from the data which have gone evanescent between lines v and vo in FIG. 6B. Save the evanescent data in a suitable storage medium such as a random access memory, as data set M2. Apply the Airy operator of equation (4) to the normal data. Sum over frequencies to get the migrated output at depth z. Inverse Fourier transform in k to obtain imaged migrated output M1.

Figure 6C:
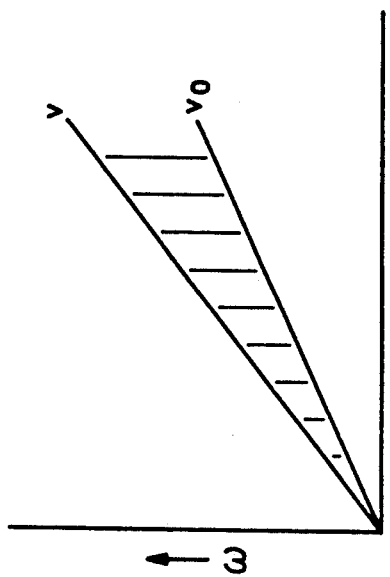
FIG. 6C is the frequency-wave number plot for the upward Airy iteration pass.
Figure 6A:
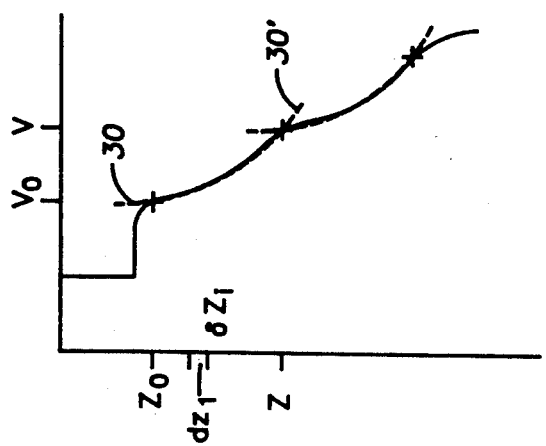
FIG. 6A is a velocity-depth graph showing the division of a section of the earth into depth intervals $\delta Z_i$ and sub-intervals $dz_i$.

Now, for the second step, for each depth interval $\delta Zi$, iterating upwards over the dzi, define $v < vo$ and $z < zo$ as in FIG. 6C. The data in set M2 that were evanescent in the previous steps have now become normal. Extract the data set M2 from memory and multiply the now normal data by the Airy operator. Sum over frequencies to get the migrated output at depth Z. Inverse Fourier transform over k to image the migrated output M3, the turned-wave contribution.

Finally add M1 and M3 to get the final migrated image.

A method that may be preferable under certain field conditions, requires but a single pass. Define the following first, second and third Airy operators as follows:

$AQ = \{[Ai(u) + iBi(u)]|Zo\}/\{[Ai(u) - iBi(u)]|Zo\}$, $BQ = \{[Ai(u) - iBi(u)]|z\}/\{[Ai(u) - iBi(u)]|Zo\}$, and $CQ = \{[Ai(u) + iBi(u)]|z\}/\{[Ai(u) + iBi(u)]|Zo\}$.

Here, Zo is the top of interval $\delta Zi$ and z is the depth of the current sub-interval.

As before we employ a preprocessed data set and assume that a linear-sloth velocity function applies over a depth interval $\delta Zi$ under study. From the best-fitting velocity-depth function, determine the constants of proportionality ai and bi. Save the original data set at the top of the interval $\delta Zi$ as DATAoA such as in a random access memory of any desired type. Multiply DATAoA by first operator AQ to provide data set DATAoB. We now have data sets DATAoA and DATAoB resident in memory.

Iterating over sub-intervals dzi within $\delta Zi$, multiply data set DATAoA by second operator BQ to obtain data set DATA(A). Here, Zo is the top of the interval $\delta Zi$ and z is the current depth step for dzi. Now, multiply DATAoB by third operator CQ to resolve DATA(B). Sum DATA(A) and DATA(B) over frequency to get the migrated output at z. DATA(B) is the turned wave contribution. Do an inverse Fourier transform over k on each of DATA(A) and DATA(B) and sum to get the final migrated-image result.

The first method is preferable where the velocity field must be modeled over numerous small depth steps on the order of hundreds of feet. The second method is useful where the velocity model can be fitted over a relatively large interval on the order of thousands of feet. Both methods are equally preferable and yield the same results. The only difference is the manner of manipulating the Airy functions to provide the requisite operators.

Figure 7:
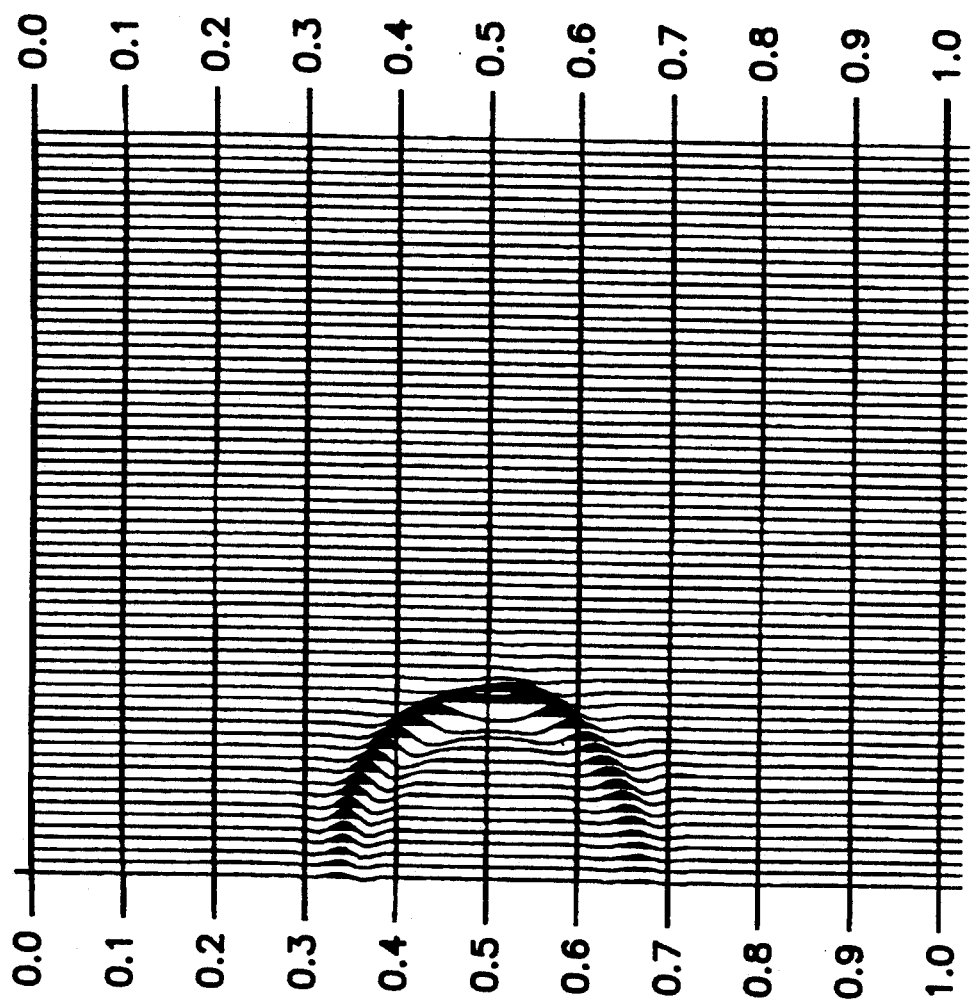
FIG. 7 is a synthetic example of a 180° migration of diving waves using the Airy transform.

FIG. 7 is a synthetic example of 180° migration of diving waves using the Airy transform, second method, of this invention.

This invention has been described with a certain degree of specificity. Those skilled in the data-processing arts will consider alternate methods for fitting the preferred velocity functions to the data and alternate methods for applying the Airy operators to the field data, all of which fall within the scope and spirit of this invention which is limited on; y by the appended claims.

What is claimed is:

1. A method for imaging seismic reflection data selected from a data volume, comprising:
   preprocessing said selected seismic reflection data by application of normal moveout, dip moveout and a time-domain-to-frequency-domain transformation;
   determining the velocity field characteristic of said data volume;
   forming a velocity model for said data volume by fitting a velocity function to said velocity field, said function being characterized by a linear gradient in sloth;

from the velocity model, calculating parameters for defining an Airy operator;

separating normal seismic data from evanescent seismic data and saving said evanescant data in a random access memory;

iterating downwardly, migrating said normal seismic data with the aid of said Airy operator;

extracting said evanescent data from memory and iterating upwardly, migrating said evanescent seismic data with the aid of said Airy operator;

summing the results of the downward and upward iterations; and inversely Fourier-transforming the summation.

2. A method for imaging a volume of seismic data, the data having been preprocessed to zero offset, comprising:

a) defining a model of the velocity field that is characteristic of the seismic data volume over at least one depth interval, $\delta Z_i$;

b) within at least one sub-interval $dz$ at depth $z$ within said depth interval $\delta Z_i$, forming first, second and third Airy operators AQ, BQ, CQ respectively derived from the proportionality constants of said velocity model;

c) with the aid of said first Airy operator, processing said volume of seismic data within said depth interval to form data set DATAoB;

d) with the aid of said second Airy operator, processing the volume of seismic data within said depth interval to form data set DATA(A);

e) with the aid of said third Airy operator, processing data set DATAoB to form data set DATA(B);

f) summing DATA(A) and DATA(B) over frequency to obtain migrated output; and g) inverse Fourier transforming the summation to form a tangible representation of the migrated data at depth z.

3. The method as defined by claim 2, wherein: said velocity model is characterized by linear sloth.

4. The method as defined by claim 2, and repeating the steps a. through g. for a plurality of depth intervals.

5. The method as defined by claim 2, wherein: said first Airy operator AQ is defined as $$AQ = \{[Ai(u)+iBi(u)]|Zo\}/\{[Ai(u)-iBi(u)]|Zo\},$$

said second Airy operator BQ is defined as $$BQ = \{[Ai(u)-iBi(u)]|z\}/\{[Ai(u)-iBi(u)]|Zo\}, \text{ and}$$

said third Airy operator CQ is defined as $$CQ = \{[Ai(u)+iBi(u)]|z\}/\{[Ai(u)+iBi(u)]|Zo,$$

where Ai and Bi are shorthand for the respective Airy functions, the letter i preceding Bi is the quadrature operator, Zo is the top of the depth interval $\delta Z_i$ under consideration and z is the depth of the current sub-interval.

* * * * *